US007720020B2

(12) United States Patent
Larsson

(10) Patent No.: US 7,720,020 B2
(45) Date of Patent: May 18, 2010

(54) METHOD AND SYSTEM FOR WIRELESS COMMUNICATION NETWORKS USING COOPERATIVE RELAYING

(75) Inventor: Peter Larsson, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 853 days.

(21) Appl. No.: 10/596,861

(22) PCT Filed: Dec. 23, 2004

(86) PCT No.: PCT/SE2004/002018

§ 371 (c)(1),
(2), (4) Date: Jun. 27, 2006

(87) PCT Pub. No.: WO2005/064872

PCT Pub. Date: Jul. 14, 2005

(65) Prior Publication Data

US 2007/0160014 A1    Jul. 12, 2007

(30) Foreign Application Priority Data

Dec. 30, 2003    (SE)    .................................... 0303602

(51) Int. Cl.
  *H04B 7/14*    (2006.01)
(52) U.S. Cl. .................. 370/315; 455/13.1; 455/16
(58) Field of Classification Search ................ 375/211; 455/7, 8; 370/315
  See application file for complete search history.

(56) References Cited

U.S. PATENT DOCUMENTS

| 5,796,760 | A | * | 8/1998 | Wiedeman et al. | .......... 375/130 |
| 5,987,011 | A | * | 11/1999 | Toh | ............. 370/331 |
| 6,889,033 | B2 | * | 5/2005 | Bongfeldt | .................. 455/11.1 |
| 6,965,568 | B1 | * | 11/2005 | Larsen | ....................... 370/238 |
| 7,006,461 | B2 | * | 2/2006 | Kilfoyle et al. | ............. 370/315 |
| 7,050,758 | B2 | * | 5/2006 | Dalgleish et al. | ........... 455/11.1 |
| 7,139,527 | B2 | * | 11/2006 | Tamaki et al. | ................. 455/16 |
| 7,184,703 | B1 | * | 2/2007 | Naden et al. | .................. 455/10 |
| 7,352,729 | B2 | * | 4/2008 | Fujiwara et al. | ............. 370/338 |
| 2002/0116715 | A1 | * | 8/2002 | Apostolopoulos | ............ 725/86 |

FOREIGN PATENT DOCUMENTS

WO    WO 2004107693 A1    12/2004

OTHER PUBLICATIONS

Sreng, Van Morning, "Coveragege Enhancement Through Two-Hop Relaying in Cellular Radio Systems", Carleton university, Ottawa, Ontario, 2002.

(Continued)

*Primary Examiner*—Lester Kincaid
*Assistant Examiner*—Isaak R Jama
(74) *Attorney, Agent, or Firm*—Roger S. Burleigh

(57) ABSTRACT

The present invention relates to relay supported wireless communication to enhance communication performance. In the wireless communication system according to the invention neighboring relay stations are arranged with substantially overlapping coverage. In the method according to the invention mobile stations makes soft association to relay stations. The mobile stations feed back the selection of relay stations and channel quality measures to the base station. The base station adapts the transmission to the relay stations based on each mobile stations reported soft associations and channel quality measures. In this way the control signaling to and from the relay stations can be very limited.

25 Claims, 10 Drawing Sheets

OTHER PUBLICATIONS

Zhang, J et al., "Adaptive Optimal Transmit Power Allocation for Two-Hop Non-Regenerative Wireless Relaying System", 2004 IEEE 59$^{th}$ Vehicular Technology Conference, 2004. VTC 2004-Spring, May 17-19, 2004, vol. 2, pp. 1213-12-17, ISSN: 1550-2252, Inspec AN: 8274474, see section III.

Scaglione, A et al., "Opportunistic Large Arrays: Cooperative Transmission in Wireless Multihop Ad Hoc Networks to Reach Far Distances", IEEE Transactions on Signal Processing, Aug. 2003, vol. 51, Issue 8, ISSN: 1053-587X, Inspec AN: 7697324, see section III.

Laneman, J. N. et al., "Distributed Space-Time-Coded Protocols for Exploiting Cooperative Diversity in Wireless Networks", IEEE Transactions on Information Teory, Oct. 2003, vol. 49, Issue 10, pp. 2415-2425, ISSN: 0018-9448, Inspec AN: 7766004, see sections III-IV.

Swedish Patent Office, International Search Report for PCT/SE2004/002018, dated Mar. 21, 2005.

* cited by examiner

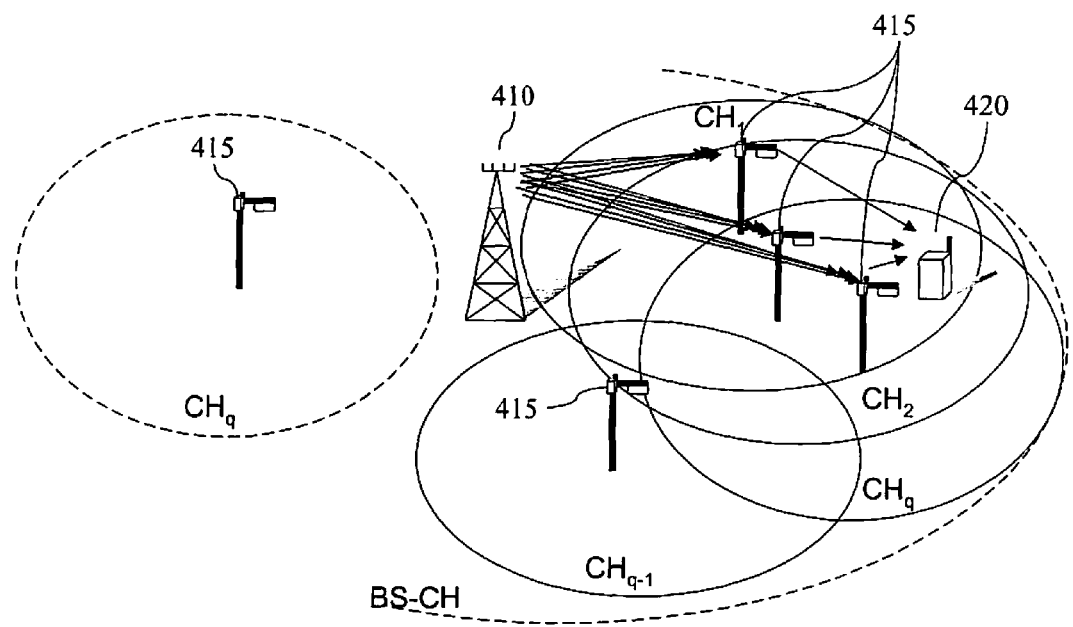
Fig. 9
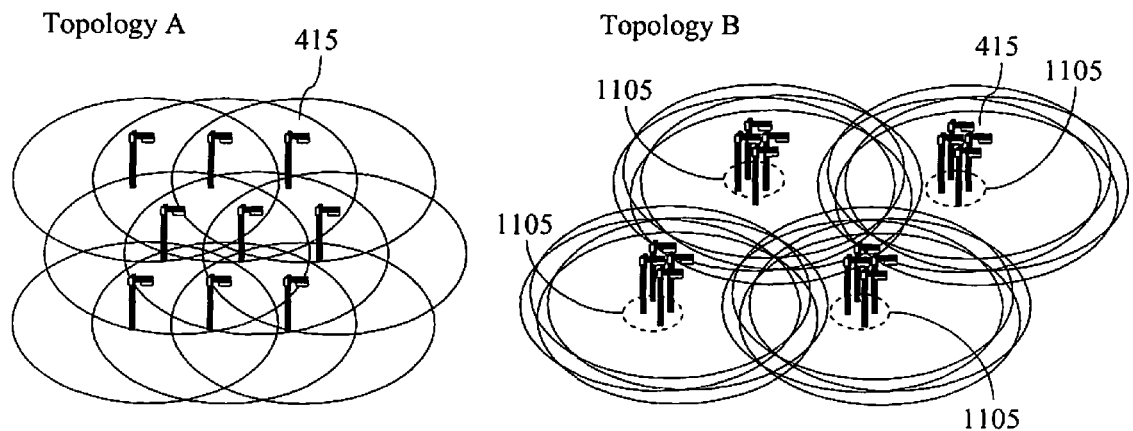
Fig. 10  Fig. 11

METHOD AND SYSTEM FOR WIRELESS COMMUNICATION NETWORKS USING COOPERATIVE RELAYING

FIELD OF THE INVENTION

The present invention relates to relay supported wireless communication to enhance communication performance. In particular the invention relates to a method and a system architecture for reducing the complexity of a two-hop wireless communication network utilizing cooperative relaying.

BACKGROUND OF THE INVENTION

A main striving force in the development of wireless/cellular communication networks and systems is to provide, apart from many other aspects, increased coverage or support of higher data rate, or a combination of both. At the same time, the cost aspect of building and maintaining the system is of great importance and is expected to become even more so in the future.

Until recently the main topology of wireless networks has been fairly unchanged, including the three existing generations of cellular networks. The topology characterized by the cellular architecture with the fixed radio base stations and the mobile stations as the transmitting and receiving entities in the networks, wherein a communication typically only involves these two entities. An alternative approach to networks are exemplified by the well-known multihop networks, wherein typically, in a wireless scenario, a communication involves a plurality of transmitting and receiving entities in a relaying configuration. Such systems offer possibilities of significantly reduced path loss between communicating (relay) entities, which may benefit the end-to-end (ETE) users.

Attention has recently been given to another type of topology that has many features and advantages in common with the multihop networks but is limited to relaying in only two (or a few) hop. In contrast to multihop networks, aforementioned topology exploits aspects of parallelism and also adopts themes from advanced antenna systems. These networks, utilizing the new type of topology, have cooperation among multiple stations as a common denominator. In recent research literature, it goes under several names, such as cooperative relaying, cooperative diversity, cooperative coding, virtual antenna arrays, etc. In the present application the terms "cooperative relaying" and "cooperative schemes/methods" is meant to encompass all systems and networks utilizing cooperation among multiple stations and the schemes/methods used in these systems, respectively. A comprehensive overview of cooperative communication schemes is given in [1]. Various formats of a relayed signal may be deployed. A signal may be decoded, re-modulated and forwarded, or alternatively simply amplified and forwarded. The former is known as decode-and-forward or regenerative relaying, whereas the latter is known as amplify-and-forward, or non-regenerative relaying. Both regenerative and non-regenerative relaying is well known, e.g. by traditional multihopping and repeater solutions respectively. Various aspects of the two approaches are addressed in [2]. The relays may forward the signal in essentially two ways; relaying the signal on the same resource or changing to another channel, e.g. in time or frequency. In the first case, a challenge is to overcome the coupling between the relay transmission and reception. This may be handled by using two antennas, and interference cancellation techniques. In the second case, the relay may simply receive the signal, and then forward it in the next slot or alternatively on another frequency band concurrently as receiving the signal.

The general benefits of cooperative relaying in wireless communication includes higher data rates, reduced outage (due to different forms of diversity), increased battery life, and extended coverage.

Various schemes and topologies utilizing cooperative relaying has been suggested, as theoretical models within the area of information theory, as suggestions for actual networks and in a few cases as laboratory test systems, for example. Examples are found in [1] pages 37-39, 41-44. The various cooperation schemes may be divided based on which entities have data to send, to which and which entities that cooperates. In FIGS. 1a-f (prior art) different topologies are schematically illustrated, showing where traffic is generated, which entity being the receiver and the path for radio transmissions.

The classical relay channel, illustrated in FIG. 1a, consists of a source that wishes to communicate with a destination through the use of relays. The relay receives the signal transmitted by the source through a noisy channel, processes it and forwards it to the destination. The destination observes a superposition of the source and the relay transmission. The relay does not have any information to send; hence the goal of the relay is to maximize the total rate of information flow from the source to the destination. The classical relay channel has been studied in [1], [7] and in [3] where receiver diversity was incorporated in the latter. The classical relay channel, in its three-station form, does not exploit multiple relay stations at all, and hence does not provide the advantages stated above.

A more promising approach, parallel relay channel, is schematically illustrated in FIG. 1b, wherein a wireless systems employing repeaters (such as cellular basestation with supporting repeaters) with overlapping coverage, a receiver may benefit of using super-positioned signals received from multiple repeaters. This is something that happens automatically in systems when repeaters are located closely and transmit with sufficiently large power. Recently, information theoretical studies have addressed this case, for example by Schein, [4] and [5], who suggest the use of coherent combining based cooperative relaying between a single sender and a single receiver using two intermediate relays. The study is purely an information theoretical analysis, limited to only two relay stations, and lacks the means and mechanisms to make the method practically feasible.

The concept of Multiple-access Channel with Relaying (a.k.a. as Multiple access channels with generalized feedback), schematically illustrated in FIG. 1c, has recently been investigated. The concept involves that two users cooperate, i.e. exchange the information each wants to transmit, and subsequently each user sends not just its own information but also the other users information to one receiver. The benefit in doing so is that cooperation provides diversity gain. There are essentially two schemes that have been investigated; cooperative diversity and coded cooperative diversity. Studies are reported in [1], for example. With respect to diversity, various forms has bee suggested, such as Alamouti diversity, receiver diversity, coherent combining based diversity. Typically the investigated schemes and topologies rely on decoding data prior to transmission. This further means that stations has to be closely located to cooperate, and therefore exclude cooperation with more distant relays, as well as the large number of potential relays if a large scale group could be formed. An additional shortcoming of those schemes is that is fairly unlikely having closely located and concurrently transmitting stations. These shortcomings indicates that the investigated topology are of less practical interest. The broadcast channel with relaying, illustrated in FIG. 1d, is essentially the reverse of the topology depicted in FIG. 1c, and therefore shares the same severe shortcomings.

A further extension of the topology depicted in FIG. 1c is the so-called interference channel with relaying, which is illustrated in FIG. 1e, wherein two receivers are considered. This has e.g. been studied in [8] and [1] but without cooperation between the receivers, and hence not exploiting the possibilities possibly afforded by cooperative relaying.

Another reported topology, schematically illustrated in FIG. 1f, is sometimes referred to as Virtual Antenna Array Channel, and described in for example [9]. In this concept, significant bandwidth expansion between a communicating station and adjacent relay nodes is assumed, and hence non-interfering signals can be transferred over orthogonal resources that allows for phase and amplitude information to be retained. With this architecture, MIMO (Multiple Input Multiple Output) communication (but also other space-time coding methods) is enabled with a single antenna receiver. The topology may equivalently be used for transmission. A general assumption is that relay stations are close to the receiver (or transmitter). This limits the probability to find a relay as well as the total number of possible relays that may be used. A significant practical limitation is that very large bandwidth expansion is needed to relay signals over non-interfering channels to the receiver for processing.

As realized by the skilled in the art real system implementations utilizing cooperative relaying needs control mechanisms for controlling the involved relay stations. The need of control arises primarily due to the mobility of the mobile stations and resulting topology changes and may for example include relay activation and deactivation. The need for control mechanisms is schematically illustrated in FIG. 2, wherein a moving mobile station 220 is communicating via the relay stations 215:1 and 215:2 at time $T_1$ and the relay stations 215:2, 215:3 and 215:4 at time $T_2$.

The control procedures are not fully described in the prior art mentioned above. However, it is indicated, for example in the case described with reference to FIG. 1f, that control messages are exchanged to and from the relay stations directed both to and from the base station and the users. Similar control structure is also disclosed in [11], wherein at least one control terminal is identified, which instructs the relay stations to receive and relay data.

The proposed control mechanism may cause the amount of control data to be excessive, especially when topology changes frequently due to that the mobile user moves fast and has to control the relays transmit parameters (e.g. power) or change relays frequently. In addition, even if topology does not change, the changes in radio propagation can be considerable and dictate fast control message exchange towards the relays. An excessive control signalling consumes radio resources that preferably could have been used for transmitting data.

A further problem that is not addressed in the prior art is how to employ session or user centric control of the relays when multiple receivers are present as they may have conflicting optimal relay configurations and parameters settings. The optimality may differ with respect to which relay is active, transmit power levels, channel assignments, space time coding options and phase adjustment etcetera used. A situation which may give arise to conflicting relay configurations and parameters settings is schematically illustrated in FIG. 3, wherein two mobile stations 320:1 and 320:2 are both communicating partly via the same relay station 315:2. The relay station 315:2 may in this scenario experience conflicting demands from the mobile stations 320:1 and 320:2. The optimization problem of finding an optimal, or close to optimal, configuration for a set of users, will, even if only a few users with potentially conflicting optimal configuration are considered, soon become very complicated and time consuming, or even in practise unmanageable.

Thus, it is in the art demonstrated that cooperative relaying has great potentials in providing for example high capacity and flexibility. However, the in the prior art proposed control mechanisms do not represent solutions that are possible to implement in realistic large-scale networks and do not take full advantage of the anticipated advantages of a network with cooperative relaying.

SUMMARY OF THE INVENTION

In the prior art architectures and methods for operating a network with cooperative relaying the mechanisms for controlling the relays produces excessive control signalling and/ or extremely complicated optimization problems. Obviously an improved method and architecture for a cooperative relaying network is needed, which exploit the anticipated advantages of a cooperative relaying network without causing excessive control signalling nor results in too massive optimization problems.

The object of the invention is to provide an architecture for a cooperative relaying network, and method of operating such network, that overcomes the drawbacks of the prior art techniques. This is achieved by the method as defined in claim 1, system as defined in claim 20, the receiver as defined in claim 25 and the base station as defined in claim 28.

The problem is solved by that the present invention provides an architecture wherein relay channels of relay stations are organized in such a way that their channels overlap spatially. The relays preferably operate as simple repeaters, typically non-regenerative, but regenerative whenever possible, for a base station, and the relay transmission parameters preferably do not change as a response to a single (or multiple) mobile stations instantaneous link quality. Each mobile station select a plurality of relay stations as candidates for communication to, provided that a plurality of relays are within reach. This process is referred to as soft association, i.e. the relays are unaware of this mobile station internal selection. The mobile stations continuously updates their soft associations based on e.g. signal quality parameters, in order to adapt to a changing radio environment caused for example by the mobile station moving. The present invention allows MIMO communication schemes, such as spatial multiplexing, to be implemented with a single antenna receiver, whereas the base station has multiple antennas and multiple relay channels are exploited. A receiver to transmitter logical feedback i.e. from the mobile station to the base station, or vice versa, without passing the relays, allow the transmission to be adapted based on instantaneous link conditions. The invention may be used in downlink or in uplink for a cellular system.

The method according to the present invention is adapted for use in a two-hop wireless communication network, wherein a base station, at least one mobile station and a plurality of relay station are engaged in, or in the process of establishing, a communication session, and wherein the relay stations forwards signals from the basestation to the at least one mobile station. The method comprises a step of each mobile station establishes soft association to a plurality of relay stations by internally selecting a set of relay channels from a plurality of relay stations with at least partially overlapping coverage, said set of relay channels associated to relay stations being candidates for use in the communication session. The soft association performed by the mobile stations is preferably based on measurements on the relay channel quality of a plurality of the relay stations of the relay stations with overlapping coverage. The mobile stations may also consider other factors such as the bandwidth requirement of a certain application in the selection step.

The mobile station feeds back their selection of relay stations to the basestation. Preferably the mobile stations also feedbacks channel quality measures, either as raw channel data or as processed information as preferred transmission parameters. The basestation uses the feedback to adapt the transmission to the relay stations. The basestation may in the communication to a specific mobile station, opportunistically decide the transmission parameters, but also which relay stations to use in the communication from the set of relay stations which mobile station has selected to have soft association with.

In one embodiment of the method according to the present invention the base station adapts the transmission to the relay stations according to the substeps of:
  identifying from the feedback conflicting demands from at least two mobile stations regarding the usage of at least one relay station, said two mobile stations having soft association to the same at least one relay station;
  initiating an optimization process for resolving the conflicting demands;
  adapting the transmission at least to the relay stations to which the two mobile stations have soft association, taking into account the result of the optimization process.

The system adapted for communication in a two-hop wireless communication network according to the present invention comprises a base station, at least one mobile/station and a plurality of relay stations, wherein the relay stations are adapted to forwarding signals from the base station to the mobile station. In the system, at least a portion of the plurality of relay stations are organized so that at least two neighbouring relay stations have substantially overlapping coverage, and the channels of the relay stations with overlapping coverage are essentially orthogonal. The mobile stations are arranged to select a set of relay stations from the relay stations with at least partially overlapping coverage, whereby establishing soft association to a plurality of relay station which are candidates to use in communication between the base station and the mobile station.

The receiver according to the present invention is adapted for use in a two-hop wireless communication network, by providing a relay station selection module adapted for selecting a set of relay stations from a plurality of relay stations with substantially overlapping coverage, said RS selection module arranged to base the selection on relay channel quality and a feedback module means for feedbacking the information on selected relays to the transmitter, and preferably also information on instantaneous channel quality.

The base station according to the present invention is provided with means for receiving feedback from the mobile stations, an optimization module adapted for identifying conflicting demands from at least two mobile stations regarding the usage of at least one relay station, said two mobile stations having soft association to the same as least one relay station and is adapted for performing an optimization process for resolving the conflicting demands. The base station is further provided with a transmission parameter adapting module adapted for determining transmission parameters for the transmission at least to the relay stations to which the two mobile stations have soft association, taking into account the result of the optimization process.

Thanks to the invention it is possible to take advantages of the possibilities offered by a cooperative relaying network without causing excessive control signaling nor massive optimization problems.

One advantage afforded by the present invention is that the relay stations are organized so that their coverage exhibit a substantial overlap and the mobile stations make soft association to selected relay stations which whereby are candidates to be used in the communication. The base stations, being informed of the selection of each mobile station adapts the transmission accordingly.

Another advantage is that possible conflicting demands from mobile stations regarding the use of one or more relay stations are resolved by the base station without excessive control signalling over the air interface.

A further advantage is that MIMO-based communication is readily implemented in the system according to the invention. Alternatively receive diversity may be implemented.

Yet a further advantage afforded by the present invention is that the soft association which preferably each mobile stations makes internally, eliminates the need for the relay stations to keep and report (via control signalling) information on which mobile station to communicate with.

Yet a further advantage afforded by the present invention is that opportunistic communication based on instantaneous carrier to interference conditions, yielding multi-user diversity gain, can be offered together with the benefits of relaying.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE FIGURES

The features and advantages of the present invention outlined above are described more fully below in the detailed description in conjunction with the drawings where like reference numerals refer to like elements throughout, in which:

FIG. 9 schematically illustrates the principle of overlapping orthogonal relay channels;

FIG. 10 schematically illustrates overlapping orthogonal relay channels organized according to one embodiment of the present invention;

FIG. 11 schematically illustrates overlapping orthogonal relay channels organized according to a further embodiment of the present invention;

DETAILED DESCRIPTION OF THE INVENTION

Figure 1:
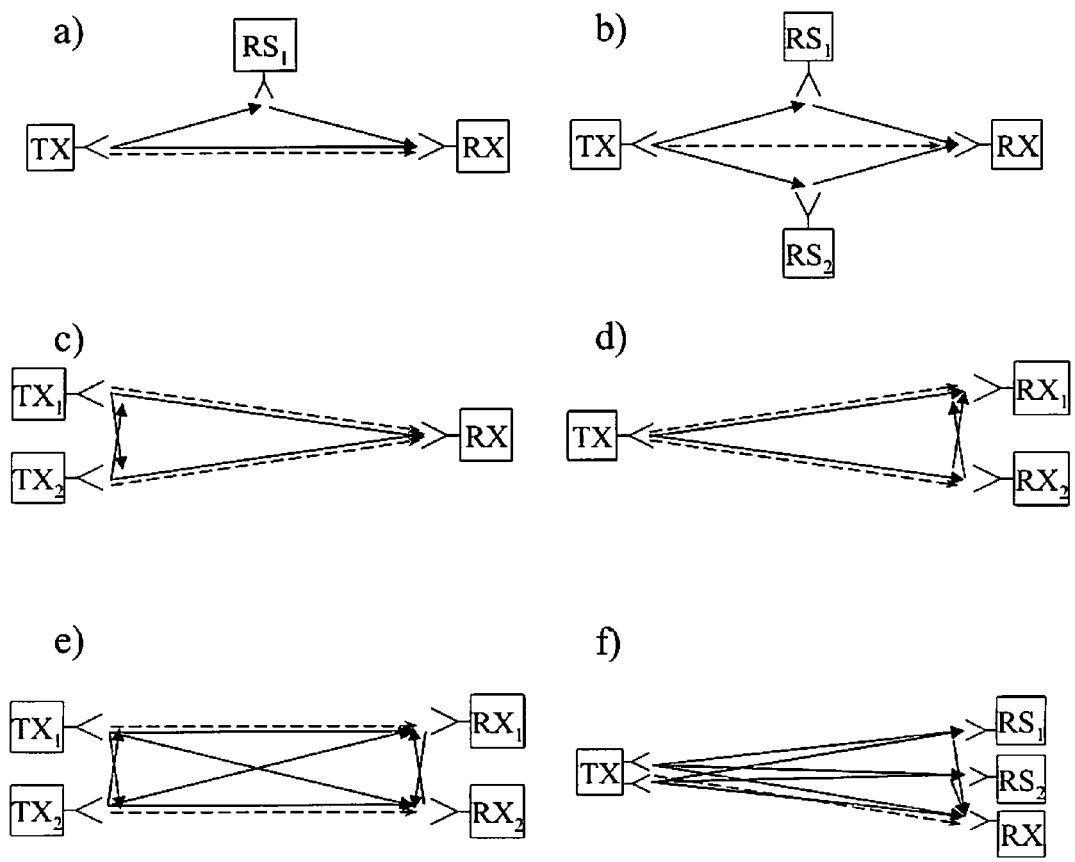
FIG. 1$a$-$f$ are schematic illustrations of the topologies of some prior art utilizing cooperative relaying.
Figure 2:
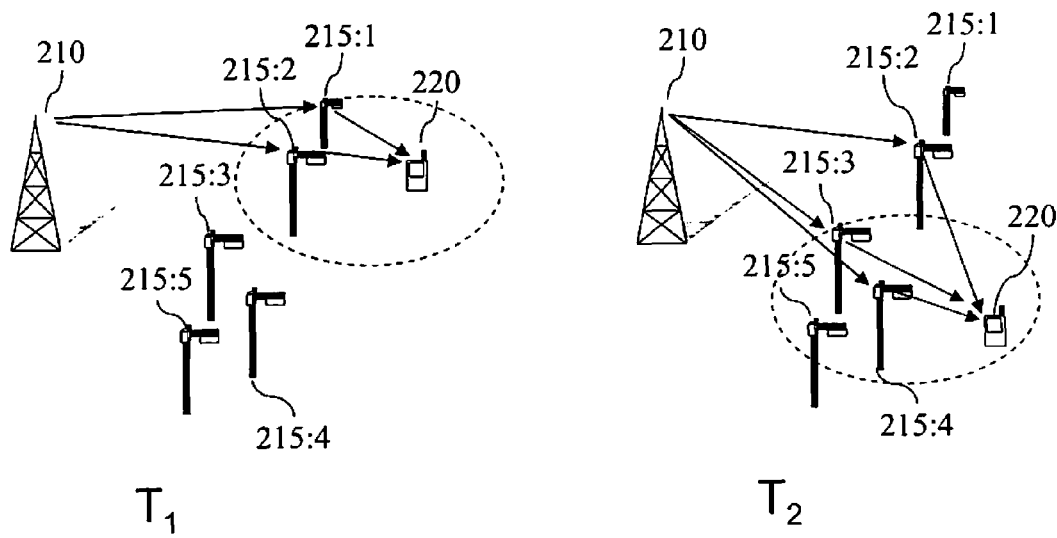
FIG. 2 schematically illustrates the process of relay station activation.
Figure 3:
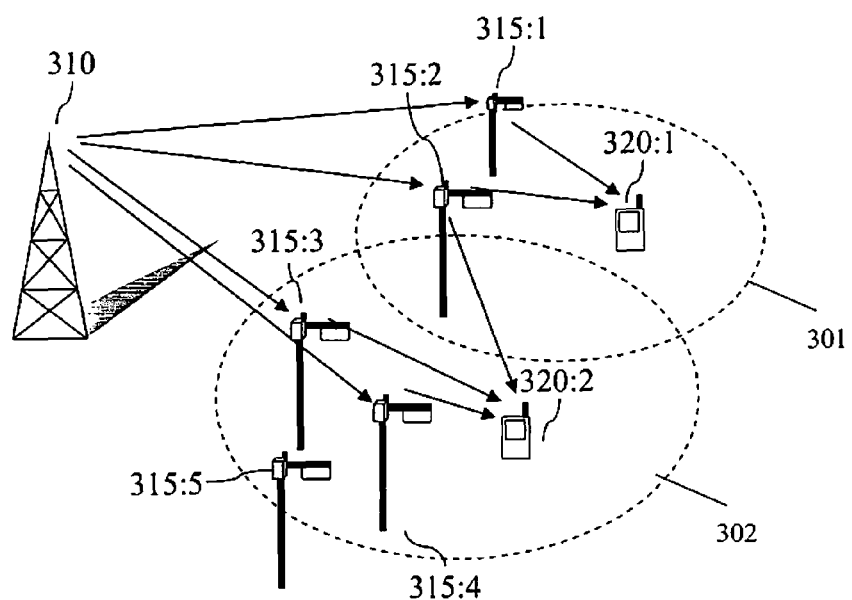
FIG. 3 schematically illustrates the problem of handling mobile stations with conflicting demands on the relay stations.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The present invention provides an architecture wherein relay channels of relay stations are organized in such a way that their channels overlap spatially. This may be achieved in a centrally or distributed manner, as will be further described below. Relay channel selection and gain factor selection of forwarded signal are of high importance for the implementation. The relays preferably operate as simple repeaters, typically non-regenerative, but regenerative whenever possible, for a base station, and the relay parameters preferably do not change as a response to a single (or multiple) mobile stations instantaneous link quality. The relays may further forward the received signal on an orthogonal resource, e.g. in time, frequency or both, alternatively using the same time-frequency resource and cancelling the transmitted signal from the received signal. Each mobile station has soft associations to multiple relays at each time instance, provided that multiple relays are within reach. While moving the mobile stations continuously updates their soft associations based on e.g. signal quality parameters. The present invention allows MIMO communication schemes, such as spatial multiplexing, to be implemented with a single antenna receiver, whereas the base station has multiple antennas and multiple relay channels are exploited. A receiver to transmitter logical feedback i.e. from the mobile station to the base station, or vice versa, without passing the relays, allow the transmission to be adapted based on instantaneous link conditions. The invention may be used in downlink or in uplink for a cellular system.

Figure 4:
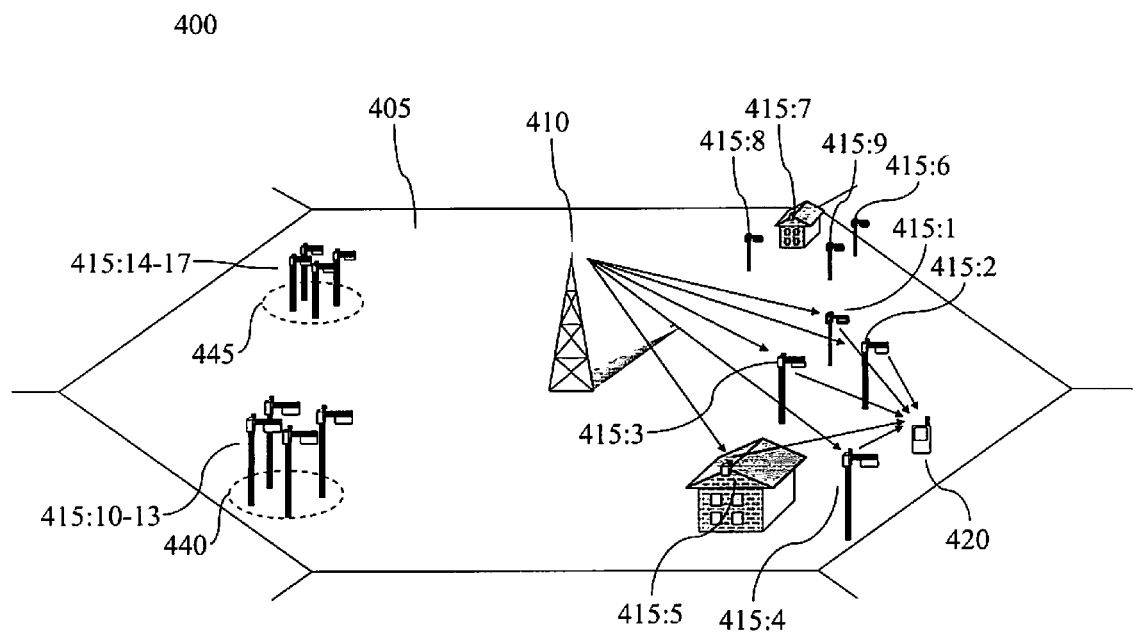
FIG. 4 schematically illustrates a cooperative relaying network utilizing the method and system architecture according to the present invention.

The network 400 outlined in FIG. 4 is an example of a cooperative relaying network wherein the present invention advantageously is utilized. The figure shows a portion 405 of the wireless network comprising a basestation 410 (BS), a plurality of relay stations 415: (RS) and a plurality of mobile stations (MS) 420. As shown in the figure, the relay stations 415 are mounted on masts and on buildings, for example. However, mobile relays, such as users mobile terminals, may also be used, either as a complement to fixed relays or independently.

The coverage of at least some, but not necessarily all, relay stations 415 should exhibit a substantial overlap, so that a mobile station 420, regardless of position, should in most circumstances be in the coverage of a plurality of relay stations 415. The channels of the relay stations with overlapping coverage should preferably be essentially orthogonal. The coverage of the relay stations is for example organized in such a way that neighbouring relay stations have overlapping coverage As exemplified in the figure, the relay stations 415:1-5 have overlapping coverage. The relay station 415:8 does not have overlapping coverage with the relay stations 415:1-5, but instead have overlapping coverage with its neighbours 415:6, 415:7 and 415:9. Alternatively a number of relay stations, 415:10-415:13 and 415:14-415:17 form clusters of relay stations 440 and 445 respectively, wherein all of the relay stations within the cluster have essentially overlapping coverage. The base station 410 may be linked to more than one relay station cluster, as exemplified with the second relay station cluster 445, as well as a plurality of groups of relay stations with partially overlapping coverage, 415:1-5 and 415:6-9. The organization of relay stations will be further discussed below.

The mobile station 420 is in active communication with the base station 410. The signalling, as indicated with arrows, is essentially simultaneously using a plurality of paths, characterized by two hops, i.e. via a plurality of relay station 415:1-5 (and/or via mobile stations acting as a mobile relay).

The network 400 serves as a radio access network in a wireless communication system, and may in addition to the depicted entities, or nodes, comprise also other nodes such as Radio Network Controllers (RNC) for controlling the base stations and the overall usage of the radio resources, for example, and Gateways to interconnect to the core network of the wireless communication system.

It should be noted that although relay based communication is used to enhance communication, direct base station 410 to mobile station 420, and vice versa, communication may still be used. In fact, some basic low rate signalling between base station 410 and the mobile station may be preferred for setting up a relay supported communication channel. For example, a cellular system function such as paging may typically not use relaying as the relay to mobile station channels are not a priori known, instead preferably, a direct base station to mobile station communication is used during call setup and similar procedures.

As discussed in the background section the prior art architectures and methods of cooperative relaying networks may typically result in conflicting situations then two or more mobile stations tries to optimize their communication to shared relay stations. In addition heavy control signalling between mobile stations and relay stations, and/or between different relay stations is to be expected. The present invention provides a network architecture and method, wherein no, or only a limited, control signalling to the relay stations 415, and/or in-between relay stations, is necessary to obtain an efficient usage of the radio resources. Instead the majority of the control signalling occurs only between the base station 410 and the mobile station 420. The relay stations 415 are mainly and preferably controlled indirectly through the control signalling between the mobile station 420 and the base station 410. Hence, potentially conflicting demands from different mobile stations 420 can be handled in the base station 410, the RNC, or somewhere else in the network, and not require extensive control signalling over the air interface involving the relays.

Figure 5:
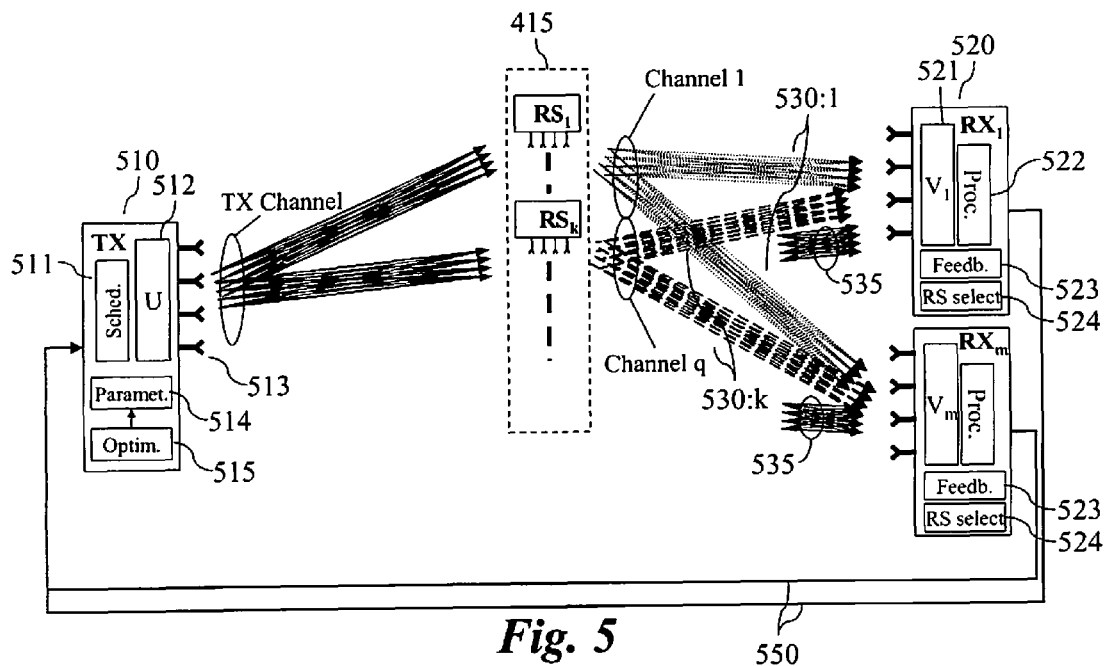
FIG. 5 illustrates the logical architecture according to one embodiment of the present invention.
Figure 6:
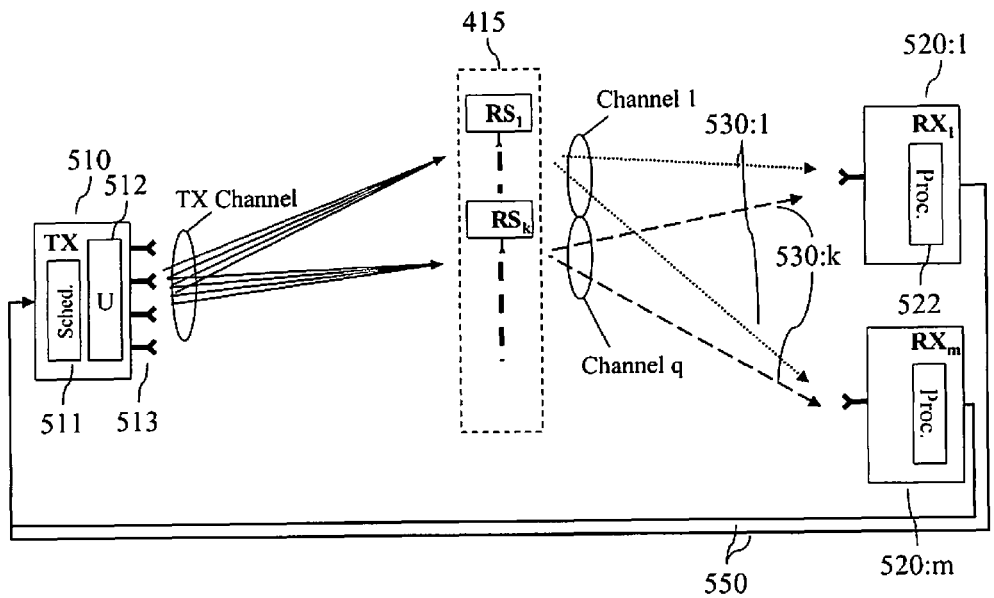
FIG. 6 illustrates the logical architecture according to one embodiment of the present invention utilizing single antennas for the relay and mobile stations.
Figure 7:
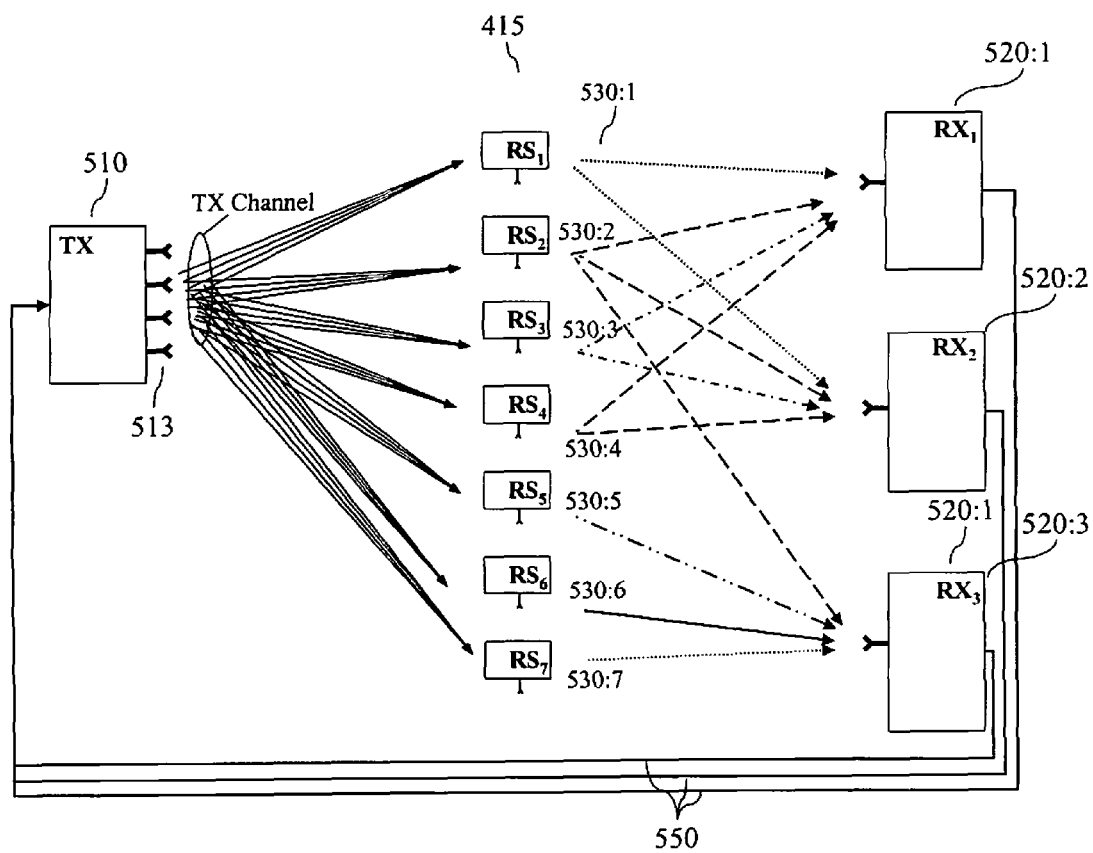
FIG. 7 schematically exemplifies the embodiment of FIG. 6, wherein two mobile stations are engaged in communication sessions, partly involving the same relay stations.

The logical architecture according to the invention is schematically illustrated in FIGS. 5, 6 and 7. The embodiment depicted in FIG. 5 represents a general case wherein the base stations 410, the relays 415 and the mobile stations 420 all are equipped with multiple antennas. FIGS. 6 and 7 represent embodiments, wherein the relays 415 and the mobile stations 420 are equipped with single antennas. Other antenna configurations, as well as a mixture of multi antenna and single antenna among the relay stations and/or mobile stations, are conceivable. The general architecture and basic operation according to the invention will be easily adaptable to various antenna configurations as well as to different radio access methods. The basic operations will primarily be described in the downlink scenario, but as appreciated by the skilled in the art, the architecture and method according to the invention is, with minor adaptations, equally suitable in uplink communication.

The base station transmitter 510 sends a data stream, which has been processed in a coding and scheduling unit 511. The data stream is preferably put through a weighting matrix U 512 and subsequently over multiple transmit antennas 513. The relay stations 415 forwards any received signal without changing relay transmit parameters such as channel, signal gain factor and coding. Alternatively, according to a further embodiment, the relays may try to decode the received signal or in other ways improve the signal fidelity prior forwarding the signal. The mobile station receivers 520, receives a plurality signals 530 forwarded from the plurality of relay stations 415. The receivers 520 typically and preferably receives signals over a multiple of different channels 530:1-$m$. The channelization may e.g. be in the frequency or time domain. Hence, the overlapping channels should be essentially orthogonal. In addition a receiver may also receive a direct signal from the transmitter over the transmitter channel 535.

In the example depicted in FIG. 6, the relay station 415:1 forwards the signal on channel 1 (530:1) which is received by a plurality of mobile station receivers 420:1-$m$. The relay station 415:$k$ forwards on channel q (530:$q$) also received by the plurality of mobile station receivers 520:1-$m$. It is generally advantageous that each mobile station receiver 520 receives signals over a plurality of channels from a plurality of relay stations 415. However, as will be further discussed below, each mobile station receiver 520 may be associated to different sets of relay stations 415. In the simplified illustration of FIG. 7 the mobile station receiver's 520:1 and 520:2 are associated to relay stations 415:1-4 and receives on channels 1-4, whereas mobile station receiver 520:3 are associated to relay station 415:2, 5, 6, 7 and receives on channels 2, 5, 6 and 7.

After receiving signals, if suitable through a weighting matrix V 521, the mobile station receiver 520 processes the signals in a processing block 522. Depending on transmit method used, the processing may involve any combination of combining, joint decoding, and multiplexing decoded data. Based on the quality of the received signal, the receivers may send feedback to the transmitter. The received signal is analyzed and the feedback is prepared in a feedback module 523. According to the present invention the logical feedback 550 from the mobile station receiver 520 is sent to the base station transmitter 510, not to the relay stations 415.

Prior to the actual communication session, and preferably also during a communication session, the mobile station 420 has selected a set of relay channels 530 corresponding to relay stations 415 in the process referred to as soft association. The process, which will be further described below, involves for example quality estimations of the relay channels and an analysis of the bandwidth requirements for an intended application executed in the mobile station. A RS selection module 523 comprised in, or in connection to, the receiver 520 of the mobile station 520 handles the process of soft association.

The transmitter may, based on this feedback, respond to changes in various transmit parameters, including antenna weights, modulation(s) and coding(s), transmit power. In particular, the transmitter may opportunistically decide which of the relay stations 415 to send data to based on instantaneous channel quality conditions. In this manner, valuable multi-user diversity gain can be offered in conjunction with the benefits offered by relaying. If the transmitter is silent, e.g. due to that there is no data to send, transmitter associated relays may stop the forwarding. The logical feedback 550 is received and processed by the transmitter 510 in a transmission parameter module 514 comprised in the transmitter 510. Possibly conflicting demands from a plurality of receivers 520 regarding the usage of one or more relay stations are resolved in an optimization module 515. The result of the optimization is outputted to the transmission parameter module 514. It should be noted that the present invention does not exclude the existence of other control signalling, for example between the relay stations 415 and the mobile stations 420 or in-between different relay stations 415. However, the present invention provides the logical feedback 550 as a main part of the control mechanism.

The modules and blocks according to the present invention described above are to be regarded as functional parts of base station or mobile station, and not necessarily as physical objects by themselves. The modules and blocks are preferably implemented as software code means, to be adapted to effectuate the method according to the invention. The terms "comprising" and "connected" should here be interpreted as links between functional parts and not necessarily physical connections. It should be understood that part of the functionalities of the transmitter 520, for example the optimization module 515, could be comprised in other nodes in the wireless network, for example in a RNC.

Figure 8:
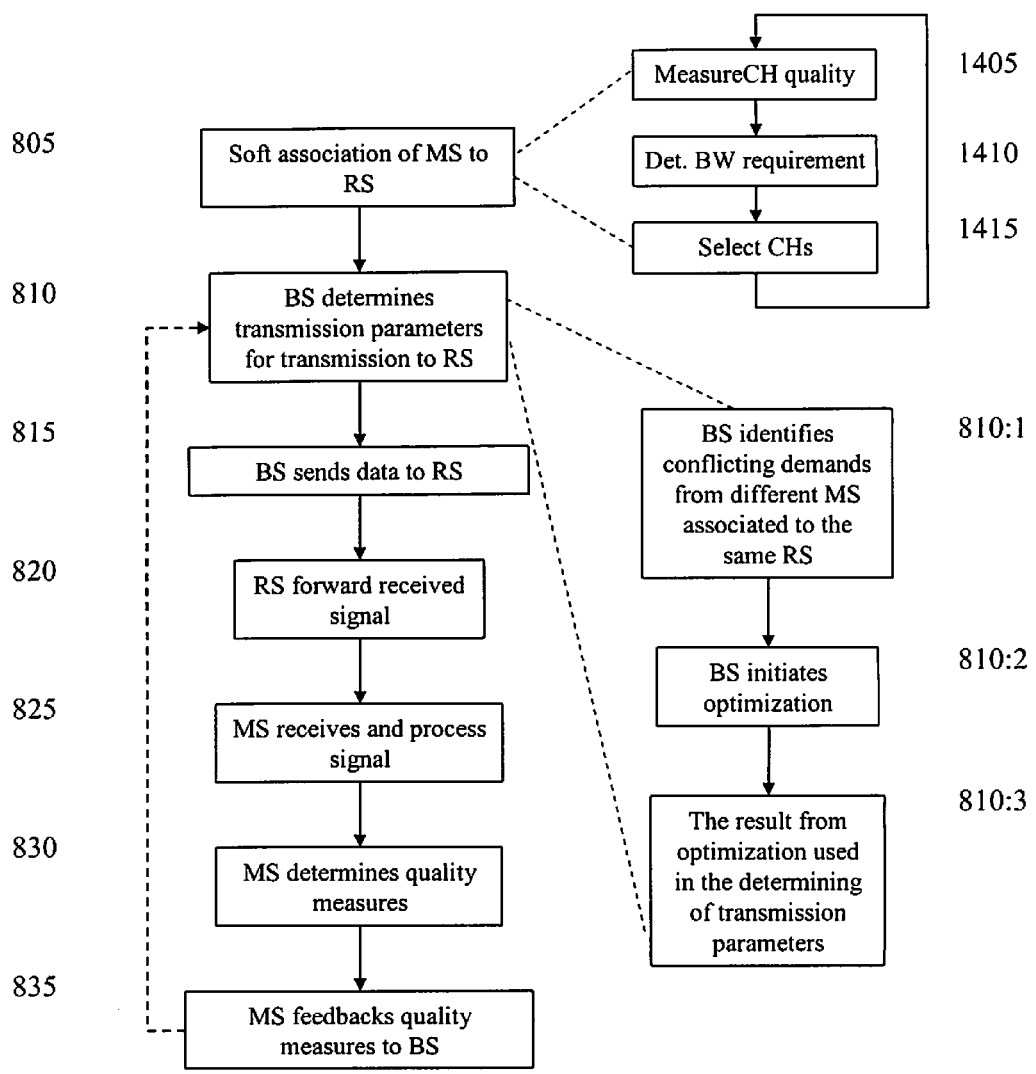
FIG. 8 is a flowchart over the method according to the present invention.

The basic method according to the present invention is outlined in the flowchart of FIG. 8. A prerequisite for the method is that the relay stations 415 are organized so that there is a substantial overlap between the channels 530 of adjacent relay stations and that the overlapping channels are essentially orthogonal. The method comprises the steps of:

805: Each mobile station 420 makes internal associations to preferably a plurality of relay stations, by selecting individual sets of associated relay stations. A process referred to as soft association as it is performed internally in each mobile station 420. The association may for example be based upon measurements on pilots (beacons) transmitted by the relay stations, or if a communication session is ongoing, on measurements or quality estimations on the communication channels, or by other means such as positioning functions. Note that the pilots may alternatively originate from the basestation and are only forwarded by the relays, i.e. the whole transmit receiver path can be characterized.

810: The base station 410 adapts the transmission to the relay stations 415. The base station 410 determines transmission parameters for the transmissions to each mobile station 420 via the relay stations 415. The parameters include, but is not limited to weights, transmit power and modulation and coding. Preferably the base station opportunistically decides, i.e. based on instantaneous channel quality conditions and other peak opportunity and conditions offered at the time of transmission, which of the relay stations 415 to send data to and what to send. The decision process involves optimizing with regards to the radio resources and the potentially conflicting demands from a plurality of mobile stations.

815: The base station transmitter 510 sends a data stream using transmission parameters determined in the previous step (810), possibly through a weighting matrix U 512 and subsequently over multiple transmit antennas 513.

820: The relay stations 415 forward the received signal. Relay transmitting parameters such as channel, signal gain factor and coding typically remains unchanged for an ongoing session. Alternatively, the relays may try to decode the received signal or in other ways improve the signal fidelity prior forwarding the signal.

825: The mobile station receiver 520 receives the signal, if suitable through a weighting matrix V 540, and processes the signals.

830: The mobile station receiver 520 determines at least one quality measure for the received signal. The quality measure includes but is not limited to signal to noise ratio SNR, bit error rate BER, frame error rate FER and combinations thereof 835: The mobile station receiver 520 feedbacks the selection of soft associated relay stations and the quality measure(s) to the base station transmitter 510 through the logical feedback 550. The base station transmitter uses the quality measure in the parameter selecting step 810.

If the communication is under establishment the process may go directly from the soft association step 805 to the feedbacking step 835.

The steps 805-835 is preferably repeated during the communication session in order to adapt to the changes in the radio environment.

The logical architecture and the method according to the invention makes it possible to reduce the complexity of the cooperative relaying network and reduce the amount of control signalling over the air interface. The control functionality and optimization needed during ongoing communication sessions are primarily possible to perform in the base station, or thereto connected nodes like an RNC. Thereby the system can better cope with conflicting demands from two or more mobile stations 420, and the risk of potentially unavailing optimization attempts between relay stations, using radio resources, is avoided. The optimization is preferably performed during the step of the base station 405 adapting the transmission to the relay stations 415 and comprises the substeps of:

810:1: The base station identifies conflicting demands from different mobile stations 420 regarding the usage of a relay station 415 in the information given in the feedbacks, The mobile stations 420 have soft association to the same relay station(s).

810:2 The base station instantiates an optimization process for resolving the conflicting demands. A number of known optimization approaches can be used, for example simulated annealing.

810:3 In the adapting of the transmission to respective relay stations 415 the base station 420 take into account the result of the optimization process.

As discussed, in order to facilitate the limited control signalling in combination with an efficient usage of the radio resources, a number of functions or features have been identified above and will be more extensively described and exemplified in the following. The features include, but are not limited to:

Relay organisation for overlapping coverage regions;
Soft association to relay channels;
Forwarding at the relay;
Receiver to transmitter logical feedback;
Communication scheme and decoding at the receiver.

Relay Organisation for Overlapping Coverage Regions

The overlapping coverage regions of the relay stations 415 is a prerequisite for an efficient usage of the radio resources according to the invention. An overlapping coverage may be achieved in various ways as illustrated in FIGS. 9, 10 and 11. FIG. 9 schematically illustrates how relays can be distributed, and relay resources, such as channel and transmit range are organized. The relay stations are here exemplarily attached to lamp poles. It is seen that relay coverage for the substantially orthogonal channels are overlapping. It is also shown that a channel can be reused multiple times within the same cell such as channel q. Channels may of course also be spatially reused between cells.

Different organization principles are illustrated in FIGS. 10 and 11. In topology A, FIG. 10, the relay stations 415 are spread out, for example in a hexagonal pattern, but with a large extent of each relay station's coverage coinciding with at least it's nearest neighbours and preferably next nearest neighbours. In topology B, FIG. 11, the relay stations 415 are grouped in a relay cluster 1105, giving almost identical coverage for the individual relay stations 415 belonging to one cluster 1105. A benefit for topology A over topology B is that the quality of a relay link will generally be better thanks to the proximity of relays. However, topology B has the benefit that clusters of relays can be replaced with a single relay entity having the same number of antennas. The antennas can then be connected by cables, optical fibres or even short-range wireless links. An implemented network may typically be a mixture of the both topology A and B, as consideration has to be taken to real life topology, economy etc.

In order to provided an efficient implementation of the wireless network a self-organization of the relay stations 415 should preferably be provided. The relays should organize themselves such that substantially orthogonal channels from different relays overlap spatially. This is mainly achieved by selecting a combination of signal gain factor and channel. An alternative option is to select relay transmit power. However, if selecting transmit power, care must be taken not to distribute noise when the input signal is weak, or plainly accept that a noisy signal is forwarded. The self-organization can for example take place when, the network is initiated, when a new node is inserted in the network, a relay node fails, or if the radio environment is permanently changed by a new building, for example. However, the transmitter may, based on long-term statistics of previous communication with users, suggest some actions for the relay to perform, such as increasing the signal gain factor or changing the channel. Note that for this option, the relay parameters are not changed in response to ongoing sessions to adapt to a specific user. It is rather to be seen as an adaptive cell planning operating on a slow time basis.

For each relay station a coverage area may be defined as the area where the outage probability is less than a predetermined threshold, and the threshold is set such that a reasonable spectrum efficiency could be achieved under communication. As a rule of thumb, a spectrum efficiency of at least 0.1 b/Hz/s should preferably be enabled. Given the definition of coverage area, one may define overlapping coverage area of two relay stations as when those stations cover a common area that is a significant fraction of at least the relay station with smallest coverage. The order of the significant fraction is preferably above 10%, and even more preferably above 20%, of the smallest cells coverage area.

Suitable algorithms for self-organization can be constructed in several ways. In the following, two principle algorithms will be discussed, a centralized and a distributed version of relay parameters organisation.

Figure 12:
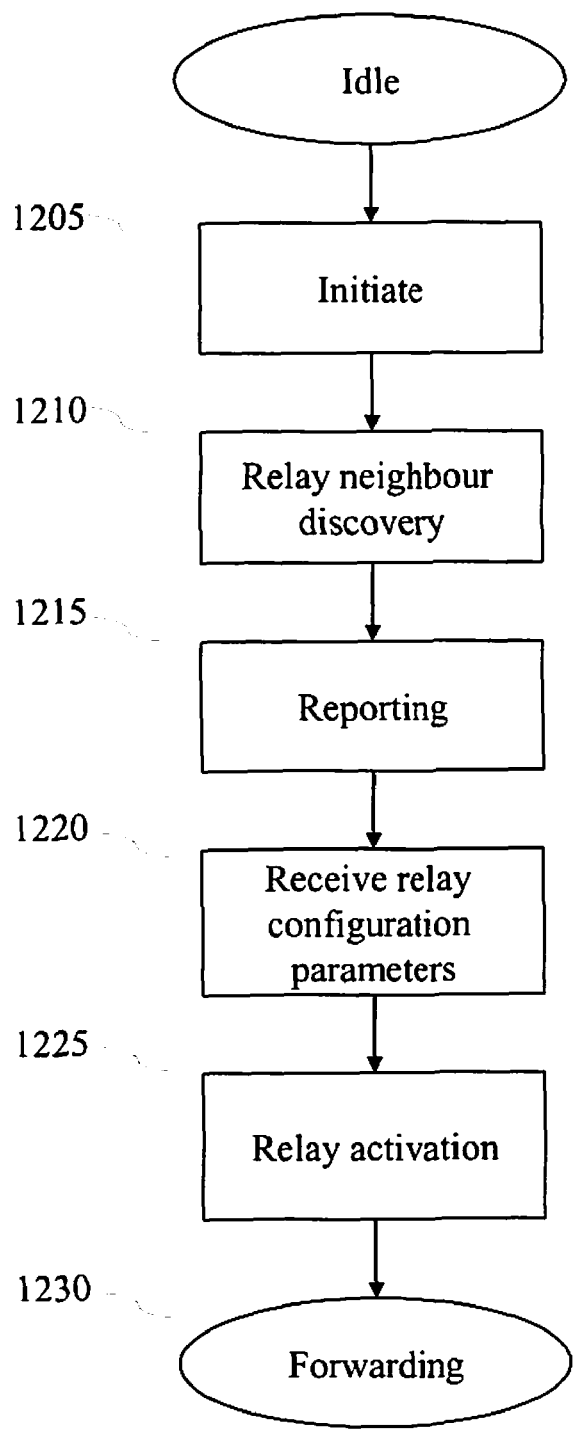
FIG. 12 is a flowchart over a centralized method of achieving overlapping orthogonal relay channels.

Centralized Operation:

The basic operation is indicated in the flowchart of FIG. 12. For simplicity, it is assumed that the relay system is started up at the first time. First the relays are initiated, step 1205, and each relay station 415 starts by detecting which relay station neighbours are available, step 1210. When doing this, path loss information (and optionally position information) can be collected from the neighbouring relay stations. In a next step 1215, the relay stations report the collected data to a central entity responsible for one or more base stations 410. The central entity then determines, step 1220, the relay configuration with respect to signal gain factor and channel allocation, and also with which base station 410 to receive and to associate with. The relay stations are then updated based on the determined parameters and activated, step 1225 to start forwarding signals received from a base station.

As this algorithm is centralized, an exhaustive search of relay channels could be performed if the number of relay stations as well as the number of channels are not to large. Otherwise, a centralized heuristic dynamic channel allocation scheme could be used. Off line computation can be used for the centralized case, so complexity is not a major hurdle. If a new relay node is introduced to the network, or a relay node fails, new relay configuration parameters can be determined and then set in the relays. Hence, the relay neighbour discovery process is something that can continuously operate, even when the phase of forwarding is taking place. Preferably, the relay-to-relay communication takes place in channels that does not interfere with user data.

Figure 13:
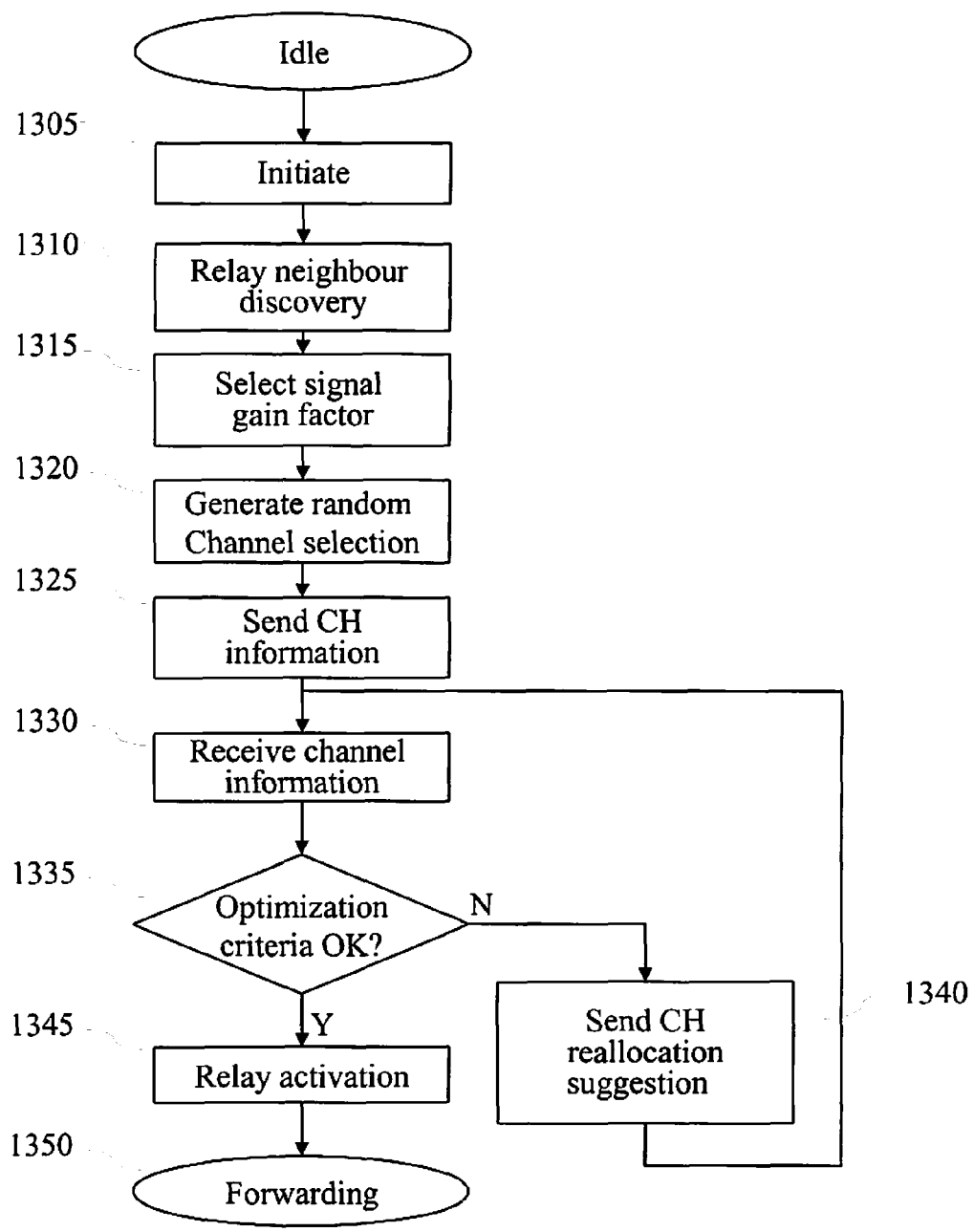
FIG. 13 is a flowchart over a distributed method of achieving overlapping orthogonal relay channels.

Distributed Operation:

Alternatively a distributed channel and signal gain factor allocation scheme may be performed. This will typically not provide an equally well optimized solution as the centralized version, but has the advantage of not requiring any reporting of neighbour related information to any central entity. Many different algorithms, more or less complex, can be envisioned. A distributed operation will be exemplified with a fairly simple scheme, which is illustrated with the flowchart of FIG. 13. After initiation of the systems, step 1305, the relay stations discover their neighbours in step 1310 (similar to the centralized case). When doing so, path loss can be estimated between the relays. Based on the path loss, and signal quality from the transmitter, signal gain factors are determined, step 1315. One rule that could be applied is that at least N neighbours should be reached but with an upper transmit power constraint limiting the possible number of relay stations. For transmission towards a base station, i.e. cellular uplink (UL), the signal gain factor could also be set in response of the link quality to a selected base station.

In step 1320, a tentative channel is randomly selected. The selected channel is then sent to the N selected relay stations, step 1325. Similarly each relay station, receives information from adjacent relays on which channels they are using, step 1330. Each relay station examines the set of selected tentative channels and assigns a channel reallocation probability corresponding to each channel. If a relay station sees a relative high frequency selection of a specific channel, i.e. relative other channels, it will result in that this channel is assigned a higher reallocation probability. The reallocation probabilities (or reallocation probability vector) are then distributed to the neighbours, step 1340. When receiving one or more reallocation probability vectors, this guides each relay station to randomly give up the old channel. One may also include a preferred channel probability vectors to guide the selection of the new channel, increasing the probability that a previously unloaded or lowly loaded channel is selected. This continues until an optimization criterion is fulfilled or another delimiter such as the number of iterations exceeds a maximum threshold, step 1335. The optimization criteria may e.g. be to strive to distribute the use of channels such that all channels are used more or less equally. One simple method is to try to minimize the variance, and if the variance does not change significantly over multiple iterations, one stops the iterations.

Although a probabilistic approach has been used here, a more deterministic approach may also be used, in which a relay station recommend another relay stations to move form one channel to another. Moreover, the transmit power can jointly be assigned together with channels in a distributed manner.

Apart from aforementioned main method, many other distributed channel allocation methods known in the art will be possible to deploy, however with the added desired feature that the coverage area may overlap among nodes. It should be noted that it is not extremely critical if the same channel is used by multiple relays, it only means that the SNR increases somewhat in an average sense. With respect to the MIMO scenario, signal processing takes place in the receiver, and using the same channel by multiple relays is transparent form the receiver point of view. However, from performance point of view, it is preferable to use as many of the available channels as possible in any given position.

Soft Association to Relay Channels

A feature of the present invention is that a mobile station 420 with an active session performs soft receiver internal association to preferably a plurality of relay channels. While the mobile station 420 traverse through regions with overlapping relay channels the soft association is updated. The soft association, which is comprised in step 805 of the flowchart of FIG. 8, may be seen as the mobile station 420 selecting a set of relay stations 415, or relay channels, which at the current position of the mobile station and/or radio environment is suitable for communication. Which relay stations 415 that eventually will be used, and to what degree, at a specific moment is, as discussed above with reference to flowchart of FIG. 8, also a result of decisions performed in the base station 410 based on the feedback from the mobile station to the base station.

Figure 14:
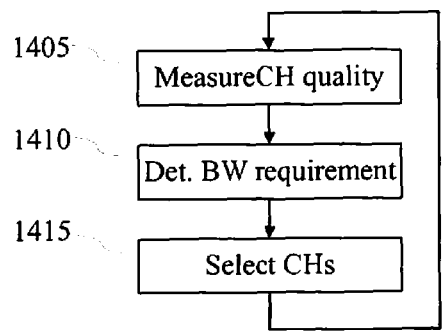
FIG. 14 is a flowchart over the soft association process according to the invention.

The mobile station 420 may use all available channels, or alternatively use a subset of those available. This may be due to hardware limitations or to considerations of power consumption. Preferably the mobile station dynamically selects a set of relay channels that maximize the performance. In particular, the channels may be selected in response to application used, e.g. with respect to bandwidth (BW) and/or quality of service (QoS) requirements. If, for example, only two channels are needed to fulfil the BW requirement, it makes little sense to use all available channels. Instead, other users may use free channels. The flowchart of FIG. 14 illustrates this operation from the receiver point of view, wherein in a first step, 1405 the mobile station 420 measures the relay channel quality, for example SNR or BER. In a second step 1410 the mobile station 420 determines the BW requirements e.g. based on the current or future applications. The mobile station 420 then, in step 1415, selects a set of relay channels, i.e. makes soft associations to the selected relay channels. In combination, or as an alternative to, the quality measurements also other information could be utilized in the selection process, for example knowledge of the mobile station's position in comparison to a relay station 415 or relay station cluster 440. The process is repeated during the communication session in order to adapt to the changing conditions.

The mobile stations may perform a soft association to relay stations also while not in active session, for the purpose of indicating its presence in a cell or part of a cell, for paging etc. However, if not in active session, or in the process of establishing such, the channel quality measures does not need to be reported. Nor should the base station perform any optimization before an active session take places. The soft association process should while the mobile station is not in active session, preferably be performed less frequently, compared to then the mobile station is in active session.

Forwarding at the Relay

The relays forwards any signals received from the transmitter. A network comprising relay stations may use a threshold criteria for a minimum required SNR for forwarding received signal. In this manner, forwarding of to noisy signals can be mitigated.

A transmitter may also signal that no data will be sent, whereby forwarding from the relays cease until data is anew transmitted.

The relay stations may also incorporate various known encoding methods. For example, a signal may be delayed by a random small time, sufficient to induce artificial frequency selectivity; (this is known as delay diversity). Another option is to use space-time coding schemes, such as Alamouti diversity. Here we assume that the relay receives two units of data, called part A and part B, on which Alamouti transmit diversity encoding is performed. To start with, a relay assumes the role of one of the antennas in Alamouti diversity. If it assumes the role of antenna 1, it transmits part A and a conjugated version of part B. If instead the relay assumes the role of antenna 2, it transmits part B first and then a negated and conjugated version of part A. Other type of space-time coding methods may also be deployed. It should be emphasized that any of the parameters used in forwarding does not depend on which user is currently using the signal forwarded by the relay.

Receiver to Transmitter Feedback

As described above one or more mobile stations 420 can feed back information to the transmitter of the base station 410, whereby the transmitter can adapt its transmit parameters.

The feedback information can be of different type depending on transmission technique and where the link control mechanism resides. If the receiver has significant part of the link control, then the mobile station 420 may decide a link mode, comprising coding and modulation scheme, for the transmitter. The mobile station 420 may also decide which transmit weights the transmitter should use. The transmit weights are particularly relevant for the MIMO case, but can also used in a beamforming context. Alternatively, the mobile station 420 may forward raw channel state information (such as complex channel gains, noise level or statistics, Signal to Noise Ratios, SNRs, or Carrier to Interference Ratios, CIRs) to the base station transmitter 510, and the transmitter determines which transmit parameters (link mode, transmit weights, transmit power etc.) to use. As appreciated by the skilled in the art, different representations ranging from actual measured values to more compact denotations of a quality classification can be used in the feedback.

If multiple mobile stations are concurrently feeding back information to control the communication link, then the base station transmitter 510 may decide to schedule traffic to the instantaneously "best" receiver or, alternatively, if multiple antennas are available at the transmitter, to send to multiple receivers concurrently. In particular, the transmitter may respond on user specific fading channel fluctuations or interference fluctuations in an opportunistic manner. In this context, channel quality is preferably sent back from the multiple receivers so the transmitter can make a central optimization.

In principle could all parameters affecting the transmission from the base station 410 be tuned as response to the feedbacks from the mobile stations 420. However, care must be taken not to cause unwanted effects. Fore example, although base station transmit power could in principle be tuned, it should preferably not be the prime parameter to tune, as it would result in fluctuating relay coverage radius. In fact the signal gain factor of the relay stations 415 are typically set under the assumption that the base station uses a fairly fixed transmit power level, and the relay powers will be limited by their maximum transmit power level. However, transmit power could occasionally be tuned to manage any direct link used between, e.g. a transmitting base station and receiving mobile station.

In order to measure channel quality, different possibilities exist. In one embodiment, the channel quality is measured on one or more pilots sent by the basestation 410 and forwarded by the relay stations 415, so the full path quality, i.e. basestation to mobile, can be estimated. If the basestation is equipped with multiple antennas, multiple pilots may be used to separate different antenna layers when the basestation is equipped with multiple antennas. Hence, the reporting of the channel qualities measured and fed back from the mobile station corresponds to the pilots. In another simplified embodiment, the channel quality is measured on one or more pilots sent from the relays, potentially also including indication from each relay on the quality the basestation to relay station link.

According to one alternative embodiment of the invention the receivers of the mobile stations 420 feed back, in step 835, preferred parameters to the base station 410, instead of the raw channel data. Preferred parameters include, but is not limited to: link mode, coding scheme, modulation scheme and antenna transmit weights. The preferred parameters reflect the optimum for each individual mobile station 420. However, as described in the basestation optimization step 810:2, the basestation may decide on other than the preferred values on the parameters, if for example conflicting demands from different mobile stations have been detected.

Communication Schemes and Decoding

Several signal processing schemes can be employed in the architecture and method according to the present invention. For example, a base station 410 with multiple antennas may in downlink use MIMO based communication to the mobile stations. The benefit of MIMO is that it can, apart from offering diversity, also be tuned to offer spatial multiplexing that in turn yields very high spectral efficiency. Alternatively, when the base station 410 only deploys one antenna, the communication to a mobile station 420 degenerates to an effective SIMO (Single Input Multiple Output) channel. Even so, the receiver of the mobile station 420 may combine the received signals through maximum ratio combining (MRC), or interference rejection combining (IRC). If the relay stations impose some space-time coding (STC) method (such as Alamouti transmit diversity) on the forwarded signals, the receiver need to consider this at the decoding. With delay diversity, the receiver just sees an "extra" frequency selective channel.

MIMO Decoding

MIMO based communication is an example of a communication scheme that advantageously is used in combination with the present invention. In a MIMO implementation using the architecture and method according to the present invention, the transmitter of the base station 410 sends a vector T over channel matrix H, where each row corresponds to one or more relay stations 415 using the same forwarding relay channel and there are as many forwarding relay channels as there are rows in the channel matrix. Each relay station 415 adds noise, which here corresponds to a noise vector N. Each relay station 415 subsequently multiplies the useful signal (i.e. a superposition of the signal vector T) with its predetermined signal gain factor. Alternatively the relay station ensures that the total output power including signal power and noise power does not exceed the maximum power level set at the specific relay station. The transmitted signal is then attenuated by the path loss between the relay station and the receiver. The signal gain factor and the attenuation can be combined into a diagonal matrix A. The receiver in turn adds noise vector W to the signal being received from the relays. The communication link can now be modelled as $$R = A \cdot (H \cdot T + N) + W \qquad \text{eq. 1}$$

If a direct link between the base station 410 and the mobile station 420 is utilized, this can also straightforwardly be incorporated in the matrix formulation above.

The above equation system can be diagonalized, e.g. by using singular value decomposition MIMO approach on the matrix A·H, similar to what is well-known in traditional MIMO based communication. However, the matrix formulation in the present invention differs from the classical MIMO system linear equation system formulation, which has the form R=H·T+W. For the invention with SVD based MIMO, it means that the transmitter will apply a unitary weight matrix U and the receiver multiplies with the Hermitian of a unitary weight matrix V. The diagonalization allows the receiver to directly receive a number of parallel substantially self-interference free MIMO subchannels.

For a mobile station with multiple antennas, as in FIG. 5, various forms of combining and decoding scheme may be used, including well-known methods such as MMSE and Single user detection (SUD), multiple user detection (MUD), e.g. exemplified by Successive Interference Cancellation or Parallel Interferences Cancellation).

In the majority of the above described embodiments, the relay stations 415 have been envisaged as equipped with omni-directional antennas. However it may be beneficial to used directional antennas that can be directed towards a selected base station. Given directional antennas, it is for the skilled man evident that this may be implemented in many ways, including fixed beamforming, or adaptive antennas. For the adaptive antenna case, the beamforming may be accomplished, for downlink from the base station, by the relay station by simply setting its receive antenna weights to maximize carrier to interference ratio, preferably also suppressing undesirable interference.

Relay stations may also advantageously be provided with multiple antennas. In this case various forms of combining and decoding scheme may be used, including any well-known method such as MMSE and Single user detection (SUD, multiple user detection (MUD) (exemplified by Successive Interference Cancellation or parallel Interferences cancellation). The purpose being that the signal quality can be enhanced in the relay prior to forwarding the signal.

An alternative embodiment for the relay channels is to use the large bandwidth offered by unlicensed frequency bands. This is particularly beneficial when considering the MIMO scenario, where the second link from the relays to the receiver may use a significantly larger BW than on the first link.

To enhance the capacity offered by a base station 410, the base station (or BS site) may support multiple sectors. Each sector will then according to the invention use different relays.

The present invention is not limited to any particular modulation scheme. Commonly employed modulations, such as those specified for 3GPP may be used. Multicarrier modulation schemes, such as Orthogonal Frequency Division Multiple Access (OFDM) may also be used.

Figure 15:
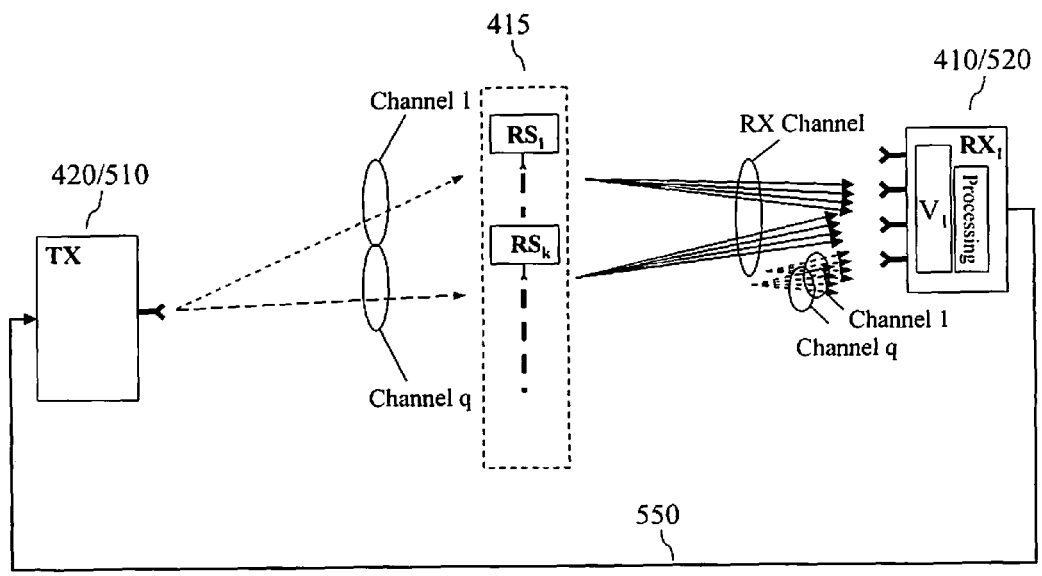
FIG. 15 illustrates the logical architecture in uplink according the present invention.

The present invention has for reasons of clarity been described and exemplified in a downlink scenario. The inventive method and logical architecture may equally well be utilized for uplink (UL) transmission, in a manner analogous to downlink. In uplink the relay stations 415 should preferably only send when the SNR exceeds a minimum threshold level, or else they will send signals with low SNRs. Also the relay station power for UL operation is set differently compared to the DL; it is set such that transmissions reach the intended receiver, i.e. the basestation 410, with a desired signal quality, preferably taking interference and noise characteristic at the receiver into account. The relay coverage overlapping does in the UL case not regard transmission, but rather reception from the mobile station side. The channel allocation may preferably be the same as for the transmission and determined with the algorithm described with reference to FIG. 14. The transmitting mobile station 420, may also invoke different transmit power on different channels. This can be controlled by providing feedback from the base station 410 (i.e. now the receiver) based on the link quality. The scenario with a mobile station 420 (now as a transmitter) with a single antenna and sending over the different relay channels is shown in FIG. 15. Also more complicated scenarios with multiple antennas at the transmitting mobile station and the relays can be deployed, analogous to the description made with reference to FIG. 5. Moreover, analogous to FIG. 6, multiple mobile stations transmitters sending data to a single base station is possible within the scope of the invention.

In the drawings and specification, there have been disclosed typical preferred embodiments of the invention and, although specific terms are employed, they are used in a generic and descriptive sense only and not for purposes of limitation, the scope of the invention being set forth in the following claims.

REFERENCES

[1]. J. N. Laneman, *Cooperative Diversity in Wireless Networks: Algorithms and Architectures*, Ph.D. Thesis, Massachusetts Institute of Technology, Cambridge, Mass., August 2002. <Thesis>

[2]. J. N. Laneman and G. W. Wornell, "An Efficient Protocol for Realizing Distributed Spatial Diversity in Wireless Ad-Hoc Networks," in *Proc. of ARL FedLab Symposium on Advanced Telecommunications and Information Distribution (ATIRP-2001)*, (College Park, Md.), March 2001. <Report>

[3]. J. N. Laneman and G. W. Wornell, "Energy-Efficient Antenna-Sharing and Relaying for Wireless Networks," in *Proc. IEEE Wireless Communications and Networking Conference (WCNC-2000)*, (Chicago, Ill.), September 2000.

[4]. B. Schein and R. Gallagher, "The Gaussian parallel relay network," in IEEE International Symposium on Information Theory ISIT2000, Sorrento, Italy, Jun. 25-30, 2000.

[5]. B. Schein. "Distributed Coordination in Network Information Theory." PhD thesis, pp. 64-68, MIT, Cambridge, Mass., August 2001. *Lippman, Bletsas*

[6]. T. M. Cover and A. A. El Gamal, "Capacity theorems for the relay channel," IEEE Trans. Inform. Theory, vol. 25, no. 5, pp. 572-584, September 1979.

[7]. E. V. D. Meulen, "Three-terminal communication channels," Advances in Applied Prob-ability, vol. 3, pp. 120 154, 1971.

[8]. A. Sendonaris, E. Erkip, B. Aazhang, "Increasing CDMA Cell Capacity via In-Cell User Cooperation", Department of Electrical and Computer Engineering, Rice University, Poster Titles, Nov. 11, 1997.

[9]. M. Dohler, E. Lefranc, H. Aghvami, "Virtual Antenna Arrays for Future Wireless Mobile Communication Systems," ICT2002, June 2002

[10]. G. W. Wornell, V. Poor, "Wireless Communications: Signal Processing Perspectives (Prentice Hall Signal Processing Series) Prentice Hall; 1st edition (April 1998).

[11]. WO03003672

The invention claimed is:

1. A method of performing communication in a two-hop wireless communication network, wherein a base station, at least one mobile station and a plurality of relay stations are engaged in, or in the process of establishing, a communication session, and wherein the relay stations forward signals from the base station to the at least one mobile station, said plurality of relay stations having at least partially overlapping coverage, said method comprising the steps of:

establishing by said at least one mobile station a soft association to said plurality of relay stations by internally selecting a set of relay channels from said number of relay stations, said set of relay channels associated to the relay stations being candidates for use in the communication session;

feeding back from the at least one mobile station, during the communication session, information on the communication quality to the base station; and, adapting in the base station the transmission to at least one of the relay stations which the mobile station has soft association with, in response to the communication quality feedback from the at least one mobile station.

2. The method according to claim 1, for a specific mobile station, wherein the step of selecting comprises the substep of the mobile station measuring the relay channel quality of said plurality of relay stations of the relay cluster.

3. The method according to claim 2, wherein, in the step of measuring, the mobile station measures on pilots sent by the at least one relay station.

4. The method according to claim 2, wherein, in the step of measuring, the mobile station measures on pilots sent by the base station and forwarded by the at least one relay station.

5. The method according to claim 2, wherein the step of selecting comprises the further steps of:

the mobile station determining bandwidth requirements based on a current application executed in the mobile station or anticipated future applications; and, said selection is based both on the relay channel quality measurements and the bandwidth requirements.

6. The method according to claim 1, wherein the step of selecting is repeated during the communication session in order to adapt to changing conditions in the radio environment.

7. The method according to claim 1, wherein the method comprises the further steps of:

at least one mobile station, during the communication session, feeding back information on the communication quality to the base station; and, the base station further adapting the transmission to at least one of the relay stations which the mobile station has soft association with, in response to the communication quality feedback from the at least one mobile station.

8. The method according to claim 1, wherein the step of the base station adapting the transmission comprises the further substeps, to be performed by the base station, of:

identifying from the feedback conflicting demands from at least two mobile stations regarding the usage of at least one relay station, said two mobile stations having soft association to the same as least one relay station;

initiating an optimization process for resolving the conflicting demands; and, adapting the transmission at least to the relay stations to which the two mobile stations have soft association, taking into account the result of the optimization process.

9. The method according to claim 7, wherein the step of feeding back comprises the step of said mobile station feeding back raw channel state information to the base station.

10. The method according to claim 7, wherein the step of feeding back comprises the step of said mobile station feeding back processed channel state information to the base station.

11. The method according to claim 10, wherein the step of feeding back comprises the step of said mobile station feeding back any of, or any combination of, the following parameters to the base station: link mode, coding scheme, modulation scheme and antenna transmit weights.

12. The method according to claim 1, wherein the method comprises MIMO based communication between the transmitter and the relay stations.

13. The method according to claim 12, wherein the transmitter of a base station sends a vector T over channel matrix H, where each row of the matrix H corresponds to one or more relay stations using the same forwarding relay channel, and the matrix H comprises as many rows as there are relay forwarding channels.

14. The method according to claim 12, wherein the transmitter of a base station sends a vector T over channel matrix H, where each row of the matrix H corresponds to one or more relay stations using the same forwarding relay channel, and there are at least two forwarding relay channels.

15. The method according to claim 12, wherein the transmitter of the base station uses singular value decomposition of the channel matrix H and applies a unitary weight matrix (U) to the outputted signal to facilitate a diagonalization with the use of the Hermitian of a unitary weight matrix (V).

16. The method according to claim 12, wherein singular value decomposition (SVD) is used and the method comprises the steps of:

the transmitter of a base station sending a vector T over channel matrix H, where each row corresponds to one or more relay stations using the same relay channel and there are as many relay channels as there are rows in the channel matrix, and applying a unitary weight matrix (U) to the outputted signal; and, the receiver performing a diagonalization by multiplying the received signal with the Hermitian of a unitary weight matrix V, whereby the receiver is able to directly receive a number of parallel substantially self-interference free MIMO subchannels.

17. The method according to claim 1, wherein the method of performing communication is preceded by a process of organizing relay stations so that the channels of at least two neighbouring relay stations are essentially orthogonal and the coverage of the at least two neighbouring relay stations are arranged to have substantial overlap.

18. The method according to claim 17, wherein the overlap between the two neighbouring relay stations is above 10% of the coverage area of the relay station exhibiting the smallest coverage area.

19. A system adapted for communication in a two-hop wireless communication network, wherein the network comprises at least a base station, at least one mobile station and a plurality of relay stations, wherein the relay stations are adapted to forwarding signals from the base station to the mobile station, at least a portion of the plurality of relay stations are organized so that at least two neighbouring relay stations have substantially overlapping coverage, and the channels of the relay stations with overlapping coverage are essentially orthogonal; wherein:
- at least one mobile station is operative to select a set of relay stations from the relay stations with at least partially overlapping coverage, thereby establishing soft association to a plurality of relay stations which are candidates to use in communication between the base station and the mobile station; and,
- logical feedbacks between the mobile stations and the base station, wherein the logical feedbacks carries information usable by the base station to adapt transmit parameters for the transmission to the relay stations.

20. The system according to claim 19, wherein a plurality of mobile stations are arranged to select individual sets of relay stations from the portion of relay stations with at least partially overlapping coverage.

21. The system according to claim 19, wherein the forwarding performed at the relay stations during a communication session is not essentially dependent on control signalling directly between the mobile stations and the relay stations.

22. The system according to claim 19, wherein the logical feedback carries information on the set of soft associated relay stations for each mobile station.

23. A base station adapted for use in a two-hop wireless communication network, wherein the network comprises a base station, at least one mobile station and at least one relay station, wherein the relay station is adapted to forwarding signals from the base station to the mobile station, the base station comprising:
- means for receiving feedback from the mobile station on the transmission to the mobile station;
- optimization means operative to identify conflicting demands from at least two mobile stations regarding the usage of at least one relay station, said two mobile stations having soft association to the same as least one relay station, and operative to perform an optimization process for resolving the conflicting demands;
- transmission parameter adapting means operative to determine transmission parameters for the transmission at least to the relay stations to which the two mobile stations have soft association, taking into account the result of the optimization process.

24. The base station according to claim 23, wherein the transmitter of the base station is operative to perform MIMO based communication and sending a vector T over channel matrix H, where each row of the matrix H corresponds to one or more relay stations using the same relay channel and there are as many relay channels as there are rows in the channel matrix.

25. The base station according to claim 24, wherein the transmitter of the base station is operative to use singular value decomposition (SVD) and apply a unitary weight matrix (U) to the outputted signal to facilitate a diagonalization with the use of a Hermitian of a unitary weight matrix (V).

* * * * *